Figure 1:
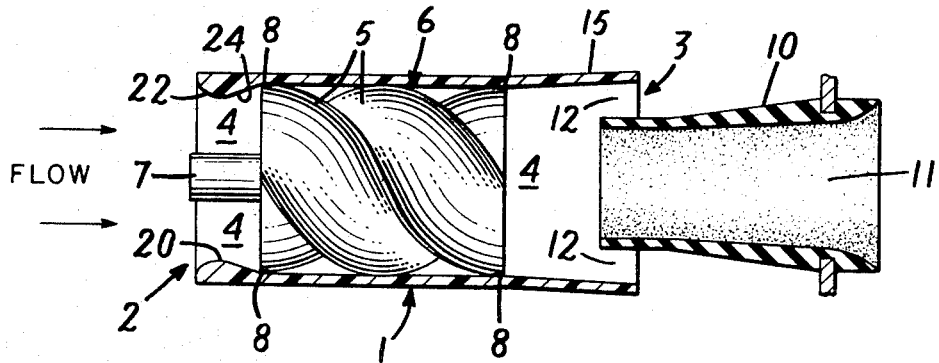

United States Patent

[11] 3,590,560

| [72] | Inventors | David B. Pall<br>5 Hickory Hill, Roslyn Estates;<br>Robert I. Gross, 50 Saddle Lane, Roslyn Heights, both of, N.Y. 11577 |
|---|---|---|
| [21] | Appl. No. | 849,571 |
| [22] | Filed | July 28, 1969 |
| [45] | Patented | July 6, 1971<br>Continuation of application Ser. No. 682,847, Nov. 14, 1967, now abandoned, Continuation-in-part of application Ser. No. 646,903, June 19, 1967, now abandoned. |

[54] TUBULAR VORTEX AIR CLEANER
13 Claims, 2 Drawing Figs.

| [52] | U.S. Cl. | 55/457 |
|---|---|---|
| [51] | Int. Cl. | B01d 45/12 |
| [50] | Field of Search | 55/456, 457, 347, 348; 209/211, 144 |

[56] References Cited
UNITED STATES PATENTS

| 379,009 | 3/1888 | Rycke | 55/457 |
|---|---|---|---|
| 680,717 | 8/1901 | Labadie | 55/457 |
| 1,735,298 | 11/1929 | Pfeffer | 55/456 |
| 2,323,707 | 7/1943 | Danz | 55/457 |
| 2,569,909 | 10/1951 | Umney | 55/457 |
| 2,616,519 | 11/1952 | Crankshaw et al. | 55/457 |
| 2,765,918 | 10/1956 | Fontein et al. | 55/459 |
| 3,030,755 | 4/1962 | Farr et al. | 55/457 |
| 3,360,909 | 1/1968 | Barnerias | 55/457 |
| 3,386,230 | 6/1968 | Riesberg et al. | 55/457 |
| 3,448,563 | 6/1969 | Sobeck | 55/457 |

Primary Examiner—Frank W. Lutter
Assistant Examiner—Bernard Nozick
Attorney—Janes, Chapman, Magidoff, Rodney and Rosenberg ABSTRACT: A tubular vortex air cleaner is provided by this invention. The central passage of the air cleaner has a constriction adjacent the inlet and a convexly curved surface leading from the inlet to the constriction.

PATENTED JUL 6 1971 3,590,560

TUBULAR VORTEX AIR CLEANER

This application is a continuation of Ser. No. 682,847 filed Nov. 14, 1967 now abandoned, and is also a continuation-in-part of Ser. No. 646,903 filed June 19, 1967 now abandoned.

This invention relates to an air cleaner of the vortex separator type, and more particularly, this invention relates to an improved vortex separator tube assembly of high separation efficiency and low pressure drop.

Air entering an engine must be substantially free of dirt or sand or the engine can become severely damaged in a relatively short time. One method of removing sand or dust from air entering an engine has been to provide tubular air cleaners. These air cleaners remove dust from air centrifugally from a vortex or cyclone stream of the dust laden air passing through the tube. The vortex is centrifugally created by either placing a deflector in the tube in the path of the influent airstream or by introducing the airstream tangentially to the tube wall, to cause the air to flow in a helical path. Since the dust and dirt particles are relatively heavy, they are thrown to the periphery of the vortex. The air at the center of the vortex is left relatively free of dust particles. The relatively clean air is normally drawn of from the center of the tube, and the dust particles collected at the periphery of the tube.

Devices of this type have been commonly employed on earthmoving equipment and other motorized equipment which tend to move into contact with high amounts of dirt.

The conventionally employed vortex separators have the disadvantage that adequate separation efficiency cannot be provided without a high pressure drop across the separator. This means that the disposition of a vortex separator air cleanser across the engine air intake results in loss of engine power.

The problem of engine power loss has not proved to be serious in connection with earthmoving equipment, since there is normally adequate surplus engine power available to drive the apparatus despite a significant power loss. However, this is not true of aircraft and thus the provision of tubular vortex separation air cleaners on aircraft has brought the problem of engine power loss sharply into focus.

The problem of removing dust or dirt from air entering an aircraft engine or even entering an aircraft cabin is particularly acute.

Aircraft and particularly turbine driven aircraft, such as helicopters, normally require a high flow of air into the engine during operation. When close to the ground, such aircraft stir up great amounts of dirt and dust which can rapidly destroy an engine. For example, during landing and takeoff a typical small helicopter engine can ingest approximately one-half pound of dire per minute if no air cleaner is provided; larger helicopters can ingest 2 to 4 pounds of dirt per minute without an air cleaner. This has resulted in engine failure or helicopters in combat operations in less than 10 percent of their normal service period, due to dust caused by erosion of the engine. Thus, the problem of removing the dust from the influent air to an aircraft is very serious.

In aircraft, the problem of removing dust from influent air is complicated by the fact that not only must dirt or dust be removed from the air entering the engine intake, but it must be removed with the least amount of power loss to the aircraft. As indicated above, if the pressure drop in the influent air across the air cleaner is too great, engine power is sacrificed. Moreover, significant power can be lost if the pressure drop is only several tenths of an inch water column above the permissible amount. Normally when taking off with a full load a helicopter requires maximum power to get high enough to translate to forward flight. If power is lost due to a relatively high pressure drop across the air cleaner, the helicopter will not be able to take off and thus the load will have to be lightened. This can mean that one or more passengers which otherwise could have been accommodated must be left behind. This is highly undesirable, especially in wartime conditions.

If, however, in any attempt to maximize power a conventional air cleaner is redesigned for a low pressure drop the result is to permit too high a percentage of dirt to enter the engine, thus causing serious damage and perhaps the almost immediate failure of the engine.

In accordance with this invention it has been found that a reduced pressure drop across a vortex separator of the type described above can be obtained by providing a constriction in the central passage of the vortex separator body adjacent the inlet and a convexly curved surface leading from the inlet to the constriction. The constriction has a diameter that is smaller than that of the central passage downstream of the constriction. The particular requirements and dimensions of the constriction and the characteristics of the portions of the central passage adjacent it are described below.

It is known in the field of fluid dynamics that an improved flow configuration of the inlet of tube will reduce the pressure drop which occurs across the tube. However, the entrance configuration heretofore normally used to obtain this result was a bellmouth inlet which consisted of a convexly flared surface having an inlet diameter greater than the tube diameter. The bellmouth at its outlet was the same diameter as the tube.

Bellmouth inlets however have not been generally employed in vortex separator tubes. This is due to the fact that vortex separator tubes are not used individually but, almost without exception, used as an array of tubes which are grouped together as closely as possible in a given space to obtain the higher possible percentage of open area and the lowest possible pressure drop. Bellmouth inlets are of greater diameter than the downstream portion of the tube. Thus, they have the disadvantage that when a plurality of tubes having flared inlets are grouped together, fewer tubes can be provided in a given cross-sectional area than would be the case if straight tubes were used. This reduces the percentage of open area in a grouping of tubes, thereby reducing the amount of flow per unit area (flow density) that can be accommodated. Therefore, the benefit obtained by the use of the bellmouth is offset by the limiting of the number of tubes that can be placed in a given area due to the expanding inlet diameter of the bellmouth.

Heretofore, it was thought and confirmed by calculations that no benefit could be obtained by employing a construction similar to a bellmouth but within the limits of the tube diameter unexpanded, i.e., a convexly curved surface leading internally from the inlet of the tube to a constriction adjacent to the inlet. This was due to the fact that calculations showed that the benefit obtained by employing a convexly curved surface such as a bellmouth would be offset by the loss that would occur due to the necessity of having a constriction in the central passage of the vortex separator tube. Thus, there would be no overall gain. In fact, calculations showed an overall loss.

It has been found, however, that by employing a constriction in the central passage of the tube adjacent the inlet of a vortex separator of the type contemplated herein, and a convexly curved surface leading from the inlet to the constriction, the pressure drop across the vortex separator can be reduced. This fact has been determined empirically, and the reason as to why, a decrease in pressure drop occurs is not understood. It is quite a surprising result, in view of the fact that constrictions in a passage, whether at the inlet, or at the outlet, or at some intermediate position, normally cause an increase in pressure drop which would counterbalance any advantage obtained by the convexly curved inlet.

By the use of the passage configuration of this invention for a given cross-sectional area, and for a given flow density, a lower pressure drop across the air cleaner is obtained. Thus power loss due to the vortex separator air cleaner is kept to a minimum. The low pressure drop is obtained without any significant sacrifice in efficiency. It is also possible, as an alternative, by varying the construction slightly to maintain the same pressure drop as a tube with a straight sided inlet but improve the efficiency of separation.

The air cleaner of this invention comprises a tubular body having a central passage with an inlet and an outlet at opposite ends; a constriction in the passage adjacent the inlet, the constriction being of lesser diameter than the central passage downstream thereof; a convexly curved surface leading from the inlet to the constriction; an angularly vaned deflector disposed in the passage on the downstream side of the constriction and adjacent thereto, said deflector being adapted to create a vortex stream in the influent air to concentrate any contaminant particles in the air at the periphery of the passage, and clean the air at the center of the passage, and an outlet member having a central passage communicating with the central passage of the tubular body disposed within said passage at the outlet, the exterior wall of the outlet member defining a generally annular passage within the central passage of the tubular body through which pass contaminant particles, while relatively clean air at the center of the passage passes through the central passage of the outlet member.

The constriction and the convexly curved surface are preferably formed integrally with the tubular body of the separator tube. It is also possible for the constriction and/or the curved surface to be formed on an insert member that is fitted into place in the central passage.

The convexly curved surface forms a smoothly curved inlet opening which begins at the inlet and terminates at the constriction in the passage. Any smoothly curved shape is suitable for the curve of the convexly curved surface such as a segment of a lemniscate, a parabola, or an arc of a circle. The largest diameter of the curved surface is at the inlet of the central passage. This point also should preferably be no greater in diameter than the largest diameter of the central passage downstream of the inlet. Thus, no extra space need be provided to accommodate the convexly curved surface due to its shape.

The constriction is preferably circular in cross section and of short length. In fact, the constriction can merely be defined by the point in the passage at which the convexly curved surface ends.

The length from the inlet of the central passage to the constriction should not be too great or poor separation will result. If the length from the inlet to the constriction is too small the convexly curved surface will be too short, and there will be an insufficient reduction in pressure drop to provide a significant improvement. In fact, if the constriction is so close to the inlet so that the convexly curved surface almost no longer exists, an increase rather than a decrease in pressure drop will occur. The length from the constriction to the inlet should be within the range from about 5 percent to about 10 percent of the overall length of the central passage.

If the constriction is too narrow relative to the diameter of the central passage an increase rather than a decrease in pressure drop will occur.

The ratio of the cross-sectional area at the constriction to the average cross-sectional central passage area downstream thereof should be within the range from about 0.60 to about 0,90 and preferably within the range from about 0.75 to about 0.85.

The central passage can also be formed with a diverging portion downstream of the constriction. The diverging portion can be shaped to define a gently tapered diffuser downstream of the constriction, or it can define sharp expansion in cross-sectional area from the constriction to the passage. In the latter case, the full diameter of the tubular body would commence immediately downstream of the constriction. For lowest pressure drop a gently tapered diffuser section should be provided since this construction aids in preventing separation of the boundary layer of air adjacent to the wall and the energy losses resulting therefrom.

The diffuser section is preferably straight sided but can be curved if desired. The diffuser should smoothly taper from the constriction to the full diameter of the tubular body. The angle of the taper for a straight sided diffuser should be within the range from about 2° to about 45° to the body and preferably is within the range of from about 5° to about 30° to the body. When a gently tapered diffuser section is used the composite of the diffuser, the constriction, and the convexly curved surface leading to the constriction is generally in the shape of a venturi.

In certain instances a diverging portion which defines a sharp expansion in cross-sectional area is preferred. A separator so formed will have almost as low a pressure drop as one with a tapered diffuser, but has a somewhat higher separation efficiency.

With this configuration of the central passage the deflector should be placed such that it abuts the diverging portion and therefore is quite close to the constriction.

A collateral benefit obtained by the use of the constriction defined herein is that it can provide a portion of increased body wall thickness at the constriction which forms a convenient situs to support the vortex separator body.

The ratio of the effective length of the central passage to its passage diameter downstream of the constriction is also significant to the pressure drop across the tube. This ratio should be maintained within the range from about 2.0 to about 2.4. It is to be noted that the term "effective length," as referred to herein, denotes the length of the central passage from the leading edge of the deflector vanes to the point at which the dirt of other contaminant particles are separated from the clean air at the center of the column by the outlet member.

The central passage of the vortex separator downstream of the inlet should be substantially cylindrical, and can be of uniform diameter from the inlet to the outlet. The applicant has found, however, the improved separation and reduced pressure drop across the tube can be obtained if the central passage is tapered from the outlet toward the inlet for at least a portion of its length to the downstream end of the deflector, such that the outlet is of greater diameter than the passage just downstream of the constriction.

For example, the central passage could be substantially cylindrical for the portion of its length which corresponds to approximately the length of the vaned deflector. The outward taper of flaring of the body can begin at a point immediately adjacent the downstream end of the deflector and continue to the outlet. The cone angle of the taper should be within the range of up to about 10° and preferably is less than 3°. The tapered portion of the central passage of the tubular body can be straight sided or curved smoothly within these angle limits. The cone angle as used herein is the angle between the two sides of the core, and is thus twice the angle from one side, or the tangent thereto if curved, to the axis.

It has been found empirically that the taper of the passage improves the efficiency of separation and reduces the pressure drop across the assembly. The following is offered as a possible explanation thereof.

The pressure drop across the air cleaner from the inlet to the outlet is largely dependent upon the vortexing of the airstream. This is due to the fact that high vortex flows create high wall friction, and this leads to high pressure differentials along the length of the tube.

By flaring or tapering the central passage from the outlet toward the inlet, to the downstream end of the deflector, the pressure drop is decreased across the tube, due to the fact that a higher area is provided at the outlet. The higher area for a given influent flow reduces the velocity of the air and reduces the wall friction and pressure drop thereby. This reduced vortexing, however, does not impair the separation efficiency due to the fact that dirt particles adjacent to the tubular wall in proximity to the outlet, when a flare is used, will be farther from the tubular outlet member. Thus, there is far less chance that a dirt particle could enter the effluent clean airstream.

The angle of the taper, as indicated above, should not, however, be larger than about 10°. This is due to the fact that when the central passage of the tubular body is tapered to an angle larger than about 10°, separation of the boundary layer of air adjacent to the wall of the passage results. This causes eddy currents which disturb the flow of effluent dirt particles and impair the efficiency of separation.

The taper of the central passage also presents several other advantages. For example, for a given diameter tubular outlet member, a large particle of dirt can be removed in the stream of effluent dirt particles without being trapped between the outlet member and the passage wall.

Furthermore, a tapered tubular body is easier to mold than a cylindrical one. This is important since the tubular body is preferably made by molding it from abrasion-resistant plastics, such as nylon and polyurethane.

Any other abrasion-resistant plastic material such as polypropylene, polycarbonate, and polyphenylene oxide can be used, as well as metals such as steel, stainless steel, nickel alloys and the like.

A vaned deflector for generating a vortex stream in the influent air is fixed in the passage downstream of the venturi. The vaned deflector is adapted to generate a vortex stream in the air to throw contaminant particles to the periphery of the passage and ensure that they hit or closely approach the wall of the passage before they reach the outlet.

The deflector is designed to impart sufficient force to the vortex stream for a given influent flow to attain this result. Moreover, this is accomplished by the instant deflector without producing an undesirably high pressure drop across the air cleaner due to the improved airflow configuration.

The deflector can be bonded in place in the central passage of the tubular body by any means known to those skilled in the art or it can be merely press-fit in position.

The deflector should be relatively long and the vanes should occupy preferably more than one-half the effective length of the passage. However, it should not be more than 60 percent of the effective length of the passage or the pressure drop across the assembly will be too high and poor separation will result.

The deflector can be composed of about three to six helical vanes, which are supported at their centers preferably on a central hub. Four vanes are preferred. The vanes, if desired, can be tapered in thickness from front to back to reduce the pressure drop across the assembly.

It is important that the helix angle and the pitch length of the vanes be selected such that there is no straight-through path from front to back of the deflector. This means that no influent particles can pass through the separator without being deflected from a straight-through course.

The deflector preferably has a forwardly extending blunt tip which protrudes beyond the vanes of the deflector up to or beyond the inlet. This blunt tip is preferably a cylindrical rod which is an extension of the hub and which has a flat end portion. A domelike end can also be used. It is also possible to employ a combination of these structures such as a dome tip having a smaller cylindrical rod protruding therefrom. These configurations of the hub end assist in guiding air toward the vanes of the deflector without increasing turbulence in the flow. Thus, the tip improves the efficiency of separation without adding to the pressure drop across the unit.

Moreover, the upstream tip can, if desired, provide a convenient member for supporting a guard screen across the front of the tube.

The tip diameter will normally be the same or less than the hub and should be selected to obtain a balance of low pressure drop and efficient separation. The hub diameter should not be too large, or the pressure drop across the assembly will be increased.

However, if the hub diameter is too large, the boundary layer of air around the hub will become unduly large and a large particle in the boundary layer could possibly pass through the assembly without being removed from the clean airstream a the center of the passage.

However, if the hub diameter is too small, the efficiency of separation is impaired. The ratio of the hub diameter to the diameter of the span of the deflector vanes which obtains a balance of low pressure drop and separation efficiency is within the range from about the like, to about 0.28. For example, for a 0.677-inch passage body diameter, the optimum hub diameter if 0.17 inch, and the preferred range of hub diameters is about 0.15 to about 0.19 inch.

It is to be noted that the length of the hub and the positioning of the deflector should be selected such that the end of the hub is either upstream of or downstream of but not at the constriction of the central passage. This is important since if the hub end is at the constriction, turbulence will result, causing inefficient separation and a relatively high pressure drop.

The deflector can be made of the same or of a different material from the tubular body. Abrasion resistant long wearing materials, such as nylon and polyurethanes are preferred. However, plastics, such as polypropylene and polycarbonate as well as metals, such as steel, stainless steel, nickel alloys, and the like, are also suitable.

An outlet member is provided at the outlet end of the central passage. This outlet member is generally tubular and is preferably frustoconical in shape. It has one end that is smaller in diameter than the passage. This end extends into the outlet of the passage. The outlet member defines an annular space between itself and the passage at the periphery of the passage through which the dust particles are removed. The central passage of the outlet member is located at the center of the passage and clean air is drawn from the assembly through the center of the outlet.

The outlet member should extend a short distance into the outlet end of the central passage of the tubular body. The outlet member can be supported in position by tabs, which can be formed on the outlet member and extend to the central passage; it can also be supported by a backplate.

Vortex separator tubes are normally grouped in an array and thus one backplate can be employed to support the outlets of many tubular bodies.

Any means can be provided to remove particles from the assembly, such as a blower, upstream of the air cleaner, or a compressor or an eductor at the discharge end drawing contaminants from the air cleaner.

In operation, influent dust laden air enters the inlet of the central passage of the tubular body, passes through the constriction and encounters and vaned deflector. The vanes of the deflector form a vortex stream in the influent air and the dust particles since they are relatively heavy are thrown to the periphery of the central passage, leaving the air at the center relatively dust-free. The dust particles are collected at the periphery of the passage and are drawn off from the annular space between the outlet member and the tubular body. Clean air is drawn off from the center of the passage through a central passage in the outlet.

Figure 2:
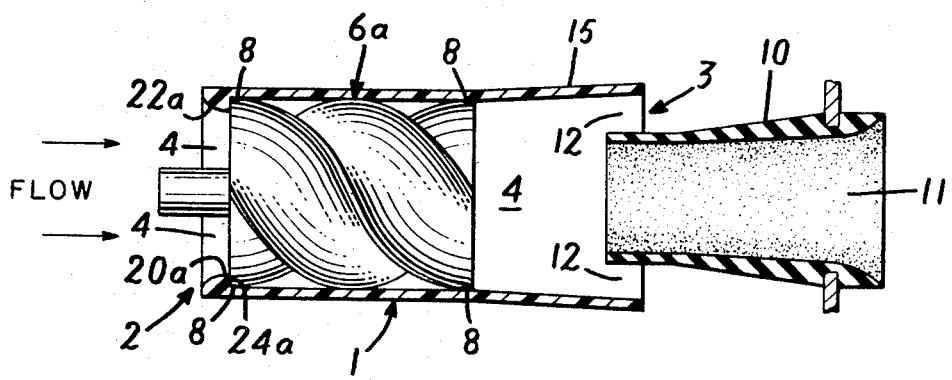

In the drawings:

FIG. 1 is a view in cross section of an air cleaner tube in accordance with this invention; and FIG. 2 is a view in cross section of another embodiment of the cleaner tube of this invention in which the diverging portion of the passage defines a sharp increase in cross-sectional area.

In FIG. 1, a vortex separator tube assembly in accordance with this invention is shown. It comprises a tubular body 1 having a central passage 4, an inlet 2 and an outlet 3.

A constriction 20 is located in the central passage 4 adjacent the inlet 2. The constriction 20 has a diameter of 0.635 inch. A vaned deflector 6 is disposed within the central passage 4 downstream of, and in proximity to, the constriction 20. The tubular body 1 is made of nylon. The mean diameter of the central passage of the body is 0.677 inch at the deflector. Its effective length is 1.32 inches.

A convexly curved surface 22 leads from the inlet 2 to the constriction 20, and a straight sided tapered diffuser portion 24, leads downstream from the constriction 20 into the deflector. The angle of taper of the diffuser is 20°. The curve of the surface 22 is an arc of a circle. The diameter of the convexly curved surface at its widest portion, i.e. at the inlet 2, is equal to that of the central passage 4 at the deflector 6. The ratio of the cross-sectional area at the constriction 20 to the average cross-sectional area of the central passage 4 downstream of the inlet is 0.85. The constriction 20 is a length of 0.097 inch from the inlet and this is 7 percent of the overall length of the tube.

The central passage has an outwardly tapered or flared portion 15 which commences immediately downstream of the portion of the passage occupied by the vaned deflector. The portion 15 extends from this point to the outlet of the body at an angle of about 2½°.

The deflector 6 is made of nylon and is bonded in position at the inlet by a resin adhesive 8 at the points at which its four vanes 5 abut the wall of the passage 4. The vanes 5 are helical. The overall length of the passage occupied by the vanes of the deflector 6 is 0.850 inch. The deflector has a cylindrical hub 7 which extends beyond the constriction 20 on the upstream side thereof to form a blunt tip. The hub 7 is 0.17 inch in diameter and extends upstream 0.25 inch beyond the vanes of the deflector.

A generally tapered tubular outlet member 10 is disposed with one end extending into the outlet 3 of the passage 4. This outlet member extends into the end of the passage 4 for a distance of 0.13 inch. The outside diameter at the end is 0.46 inch. The outlet member has a central open passage 11 therethrough for the removal of clean air. The outlet defines an annular space 12 between the tubular body 1 at the periphery of the tube for the removal of dirt particles. The outlet member is made of polyurethane rubber. The outlet member in this embodiment is supported by a plate (not shown).

As an example of the operation of the instant assembly as compared to a conventional separator without a constriction adjacent the inlet and a convexly curved surface leading thereto, air containing coarse grade test dust, as defined by SAE Recommended Practice J-736a, was sucked through a cluster of conventional separators at a rate of 7.6 s.c.f.m. per separator by a blower, disposed downstream of the vortex separator tube assemblies to establish columnar flows of dirt laden air. A vortex was created in the stream of air passing through each separator tube by the deflector, and the dust particles were forced to the periphery of each tube leaving the air at the center relatively clean. The dust particles were drawn off from the annular space between the outlet member and the wall of the passage, and a core of clean air was drawn off through the central passage 11 of the outlet. A pressure drop of 3 inches water column occurred and the separation efficiency was 92 percent.

This is to be compared with the tubular vortex separator described hereinabove with a constriction adjacent the inlet of a convexly curved surface leading to the constriction from the inlet and a tapered diffuser leading from the constriction downstream into the central passage. This separator tube has an efficiency of 92 percent and a pressure drop of 2.70 inches water column for the same flow.

It is to be noted that there is a 10 percent difference in pressure drop.

In FIG. 2 another embodiment of the air cleaner tube of this invention is shown. This embodiment is designed to yield a higher efficiency at the same pressure drop as a conventional separator. It is similar to that shown in the previous embodiment with the exception that the diverging portion 24a of the passage in this embodiment defines a sharp expansion in diameter from the constriction 20a to the full diameter of the passage. The deflector 6a abuts the diverging portion and thus is quite close to the constriction 20a. The ratio of the constriction to the downstream central passage diameter is the same as that on the previous embodiment. The constriction 20a is 0.97 inches downstream of the inlet and this is 7 percent of the overall length of the central passage. In this embodiment the curve of the convexly curved surface 22 is a lemniscate. Under the same conditions as in the previously discussed embodiment the pressure drop across the tube was 3 inches water column and its efficiency was 95 percent.

Thus, the instant invention provides an improved separator tube assembly of low pressure drop and high separation efficiency. It is a substantial improvement over the air cleaners known to the prior art.

The instant air cleanser is particularly suited for removing dust and dirt particles from air entering aircraft engines and passenger cabins. The air cleaner of this invention can be positioned across the air inlet of either the cabin or the engine to thereby clean all influent air. The instant air cleaner can also be used for removing dirt from air on earthmoving equipment, and in any system in which the level of dirt concentration in the air is high.

It is to be noted that although the tubular vortex separator of this invention has been described in connection with removing dust particles from air it is suitable for use in removing any solid contaminant s from any gas.

Having regard to the foregoing disclosure, we claim the following as the inventive and patentable embodiments thereof.

1. An air cleaner particularly suited for use as one of an array of closely spaced air cleaners for efficiently removing contaminant particles from relatively high velocity air with a minimum pressure drop, comprising, in combination, a tubular body defining an inlet opening at one end, an outlet opening at the opposite end, and a central passage therebetween; a deflector coaxially mounted in the passage in a fixed position adjacent the inlet opening, said deflector having a plurality of helical vanes supported on a central hub, and abutting the wall of the tubular body, said vanes being positioned at an angle to the line of airlfow from the inlet opening to the outlet opening so as to create a vortex stream in the influent air which concentrates the contaminant particles in the air at the periphery of the central passage, thereby leaving the air at the center of the central passage relatively clean; a generally tubular outlet member coaxially positioned at the outlet end of the tubular body, having an inlet opening at one end disposed within the central passage adjacent the outlet of the tubular body, an outlet opening at the opposite end, and a central passage therebetween for delivery of clean air from the central passage of the tubular body, the inlet opening of said member being of lesser diameter than the outlet opening of the tubular body and defining an annular contaminant exhaust passage for the passage of contaminant particles between the exterior of the outlet member and the wall of the tubular body; the tubular body of uniform diameter for the major portion of its length from the inlet end to the end of the deflector, and at the outlet end in the region from the downstream end of the deflector to the outlet, adjacent the outlet member, having a diameter ranging from zero taper to a gradual outward taper of up to about 10°; and a circumferential constriction in the central passage and positioned adjacent the inlet opening and upstream of the deflector vanes, said constriction being of lesser diameter than the adjacent portions of the central passage both upstream and downstream thereof, and a convexly curved circumferential surface extending from the wall of the tubular body into the central passage from the inlet opening of the tubular body to the constriction to define with the constriction a smoothly curved but restricted air cleaner entrance configuration, to guide flow into the central passage with a minimum of pressure drop for a given particle removal efficiency.

2. An air cleaner in accordance with claim 1 in which the tubular body wall is shaped to define the constriction and the convexly curved surface.

3. An air cleaner in accordance with claim 1 in which the ratio of the cross-sectional area at the constriction to the average cross-sectional area of the central passage of the tubular body downstream of the constriction is within the range of from about 0.60 to about 0.90.

4. An air cleaner in accordance with claim 1 in which the ratio of the length from the inlet opening to the constriction to the overall length of the central passage is within the range of from about 0.05 to about 0.10.

5. An air cleaner in accordance with claim 1 in which the hub of the deflector extends upstream of the constriction.

6. An air cleaner in accordance with claim 1, in which the deflector, the outlet member, and the tubular body are made of plastic material.

7. An air cleaner in accordance with claim 1 in which the outlet is tapered at an angle of up to 3°.

8. An air cleaner in accordance with claim 1 in which the central passage of the tubular body has a diverging portion downstream of the constriction.

9. An air cleaner in accordance with claim 8 in which the diverging portion defines a sharp expansion in cross-sectional area from the constriction to the wall of the central passage.

10. An air cleaner in accordance with claim 8 in which the diverging portion is a tapered diffuser.

11. An air cleaner particularly suited for use as one of an array of closely spaced air cleaners for efficiently removing contaminant particles from relatively high velocity air with a minimum pressure drop comprising, in combination, a tubular body defining an inlet opening at one end, an outlet opening at the opposite end, and a central passage therebetween; a deflector coaxially mounted in the passage in a fixed position adjacent the inlet opening, said deflector having a plurality of helical vanes supported on a central hub and abutting the wall of the tubular body, said vanes being positioned at an angle to the line of airflow from the inlet opening to the outlet opening so as to create a vortex stream in the influent air which concentrates the contaminant particles uniform diameter for the major portion of its length from the inlet end to the end of the deflector, and at the outlet end in the region from the downstream end of the deflector to the outlet, adjacent the outlet member, having a diameter ranging from zero taper to a gradual outward taper of up to about 10°; and a circumferential constriction extending inwardly from the wall of the tubular body into the central passage of the tubular body adjacent the inlet opening, said constriction being of lesser diameter than the adjacent portions of the central passage of the tubular body both upstream and downstream thereof and comprising an annular protruding portion of the wall of the tubular body adjacent the inlet opening, said protruding portion defining a cross-sectional area whose ratio to the average cross-sectional area of the central passage downstream thereof is within the range of from about 0.60 to about 0.90; said tubular body further defining a convexly curved circumferential surface extending downstream from the wall of the tubular body into the central passage from the inlet opening and terminating at the constriction, said convexly curved surface being of substantially no greater diameter at the inlet opening than the largest diameter of the tubular body downstream thereof; and a diverging portion defined by the tubular body and extending outwardly from the constriction to define a portion of the central passage of greater cross-sectional area than the constriction.

12. An air cleaner in accordance with claim 11 in which the diverging portion is a tapered diffuser.

13. An air cleaner in accordance with claim 11 in which the diverging portion defines an expansion in cross-sectional area.

2-122 Cont.

PO-1050
(5/69)

UNITED STATES PATENT OFFICE
CERTIFICATE OF CORRECTION

Patent No. 3,590,560          Dated July 6, 1971

Inventor(s) DAVID B. PALL et al.

It is certified that error appears in the above-identified patent and that said Letters Patent are hereby corrected as shown below:

| | | |
|---|---|---|
| Column 1, line 11 | : | "dirt" should be -- dust -- |
| Column 1, line 34 | : | "cleanser" should be -- cleaner -- |
| Column 1, line 52 | : | "dire" should be -- dirt -- |
| Column 1, line 54 | : | "or" should be -- on -- |
| Column 2, line 17 | : | After "of", second occurrence, should read -- a -- |
| Column 2, line 59 | : | Delete the comma (,) |
| Column 3, line 55 | : | "0,90" should be -- 0.90 -- |
| Column 5, line 69 | : | "a" should be -- at -- |
| Column 5, line 74 | : | "the like" should be -- 0.22 -- |
| Column 6, line 40 | : | "and" second occurrence, should be -- the -- |
| Column 7, line 34 | : | "J-736a" should be -- J-726a -- |
| Column 8, line 3 | : | "cleanser" should be -- cleaner -- |
| Column 8, line 28 | : | "airiflow" should be -- air flow -- |
| Column 8, line 44 | : | After "body", add -- being -- |

3,590,560

Column 9, line 26 : After "particles", add the following:
-- in the air at the periphery of the central passage thereby leaving the air at the center of the central passage relatively clean; a generally tubular outlet member coaxially positioned at the outlet end of the tubular body, and having an inlet opening at one end disposed within the central passage adjacent the outlet of the tubular body, and an outlet opening at the opposite end, and a central passage therebetween for delivery of clean air from the central passage of the tubular body, the inlet opening of said outlet member being of lesser diameter than the outlet opening of the tubular body and defining therewith an annular contaminant exhaust passage for the passage of contaminant particles between the exterior of the outlet member and the wall of the tubular body; the tubular body being of --

Signed and sealed this 9th day of May 1972.

(SEAL)
Attest:

EDWARD M. FLETCHER, JR.
Attesting Officer

ROBERT GOTTSCHALK
Commissioner of Patents